United States Patent
Tahan et al.

(10) Patent No.: US 8,284,939 B2
(45) Date of Patent: Oct. 9, 2012

(54) SYSTEMS AND METHODS FOR PREVENTING TRANSMITTED CRYPTOGRAPHIC PARAMETERS FROM COMPROMISING PRIVACY

(75) Inventors: Thomas Tahan, San Diego, CA (US); Jun Liu, San Diego, CA (US)

(73) Assignee: Neology, Inc., Poway, CA (US)

( * ) Notice: Subject to any disclaimer, the term of this patent is extended or adjusted under 35 U.S.C. 154(b) by 671 days.

(21) Appl. No.: 12/243,409

(22) Filed: Oct. 1, 2008

(65) Prior Publication Data
US 2009/0122986 A1    May 14, 2009

Related U.S. Application Data

(60) Provisional application No. 60/976,589, filed on Oct. 1, 2007.

(51) Int. Cl.
*H04L 29/06* (2006.01)
(52) U.S. Cl. .......... 380/270; 380/283; 380/255; 380/30; 340/10.1; 340/10.51; 340/10.42; 340/10.52; 713/168; 713/151
(58) Field of Classification Search .................. 380/270, 380/283, 255, 30; 340/10.1, 10.51, 10.42, 340/10.52; 713/168, 171
See application file for complete search history.

(56) References Cited

U.S. PATENT DOCUMENTS

| | | | |
|---|---|---|---|
| 2005/0036620 A1* | 2/2005 | Casden et al. | 380/259 |
| 2006/0077034 A1 | 4/2006 | Hillier | |
| 2006/0153375 A1* | 7/2006 | Yi | 380/44 |
| 2007/0081670 A1* | 4/2007 | Topham et al. | 380/239 |
| 2007/0106897 A1* | 5/2007 | Kulakowski | 713/171 |
| 2007/0120651 A1* | 5/2007 | Kobayashi et al. | 340/10.51 |
| 2007/0165861 A1 | 7/2007 | Kuhl et al. | |
| 2007/0206797 A1* | 9/2007 | Chan et al. | 380/270 |
| 2008/0104392 A1* | 5/2008 | Satoshi et al. | 713/164 |
| 2008/0109654 A1* | 5/2008 | Hardacker et al. | 713/162 |
| 2008/0137862 A1* | 6/2008 | Morita et al. | 380/270 |

OTHER PUBLICATIONS

International Search Report of PCT/US08/78421.

* cited by examiner

*Primary Examiner* — Jeffrey Pwu
*Assistant Examiner* — Hee Song
(74) *Attorney, Agent, or Firm* — Procopio Cory Hargreaves & Savitch LLP; Noel C. Gillespie

(57) ABSTRACT

A method for secure cryptographic communication comprises transmitting information that identifies a group key from a first device to a second device. The method further comprises, in the first device, using the group key to encrypt an input vector, transmitting the encrypted input vector, encrypting privacy-sensitive information using a device key, an encryption algorithm, and the input vector, and transmitting the encrypted privacy-sensitive information to the second device.

21 Claims, 2 Drawing Sheets

SYSTEMS AND METHODS FOR PREVENTING TRANSMITTED CRYPTOGRAPHIC PARAMETERS FROM COMPROMISING PRIVACY

RELATED APPLICATIONS INFORMATION

The application claims the benefit under 35 U.S.C. 119(e) of U.S. Provisional Patent Application Ser. No. 60/976,589, filed Oct. 1, 2007 and entitled "Systems and Methods for Preventing Transmitted Cryptographic Parameters from a Compromising Privacy," which is incorporated herein by reference in its entirety.

BACKGROUND

1. Technical Field

The embodiments described herein relate to cryptographic communication and in particular to systems and methods for enhancing the security of cryptographic communications, while still allowing the use of common cryptographic schemes.

2. Related Art

Symmetric cryptography is often used to protect information transmitted over a network or via radio or light transmissions. The protections afforded by symmetric cryptographic can include confidentiality, integrity, source authentication, and replay protection. In some applications, it may be necessary to also protect the privacy of the user of the transmitting device.

Radio frequency Identification (RFID) systems are an example of a type of system in which symmetric cryptography can be used to provide secure communications. For example, symmetric cryptography can be used to protect the confidentiality of a unique identification number transmitted between an RFID tag on an identification card, document, etc., and an RFID reader. In such instances, each RFID tag can have a unique secret key, used as input to the symmetric cryptographic algorithm that is used to encrypt data such as a unique identifier on the tag prior to transmission.

In some cases, the cryptographic parameters used for the encryption can be transmitted with the cipher text to enable decryption at the receiver. Such parameters can include an Initialization Vector (IV) used with some symmetric encryption modes. These cryptographic parameters can contain information that could compromise the identity of the holder of the identification card or document if, e.g., they were intercepted during transmission. For example, if a counter is used as IV for a symmetric algorithm, e.g., in counter mode or cipher feedback mode, then the current value of the counter used as the IV is a form of identifier. If this identifier were to be intercepted, then it is possible that the cryptography can be defeated and the user's identity, or other sensitive information, could be compromised.

By way of background, FIG. 1 is a diagram illustrating an exemplary RFID system 10. In system 10, RFID interrogator 102 communicates with one or more RFID tags 110. Data can be exchanged between interrogator 102 and RFID tag 110 via radio transmit signal 108 and radio receive signal 112. RFID interrogator 102 comprises RF transceiver 104, which contains transmitter and receiver electronics, and antenna 106, which are configured to generate and receive radio transit signal 108 and radio receive signal 112, respectively. Exchange of data can be accomplished via electromagnetic or radiative coupling in the RF spectrum in combination with various modulation and encoding schemes.

RFID tag 110 is a transponder that can be attached to an object of interest and act as an information storage mechanism. In many applications, the use of passive RFID tags is desirable, because they have a virtually unlimited operational lifetime and can be smaller, lighter, and cheaper than active RFID tags that contain an internal power source, e.g. battery. Passive RFID tags power themselves by rectifying the RF signal emitted by the RF scanner.

RF transceiver 104 transmits RF signals to RFID tag 110, and receives RF signals from RFID tag 110, via antenna 106. The data in transmit signal 108 and receive signal 112 can be contained in one or more bits for the purpose of providing identification and other information relevant to the particular RFID tag application. When RFID tag 110 passes within the operational range of RF interrogator 102, RFID tag 110 is excited and transmits data back to RF interrogator 102. A change in the impedance of RFID tag 110 can be used to signal the data to RF interrogator 102 via receive signal 112. The impedance change in RFID tag 110 can be caused by producing a short circuit across the tag's antenna connections (not shown) in bursts of very short duration. RF transceiver 104 senses the impedance change as a change in the level of reflected or backscattered energy arriving at antenna 106.

Digital electronics 114, which can comprise a microprocessor with memory, performs decoding and reading of receive signal 112. Similarly, digital electronics 114 performs the coding of transmit signal 108. Thus, RF interrogator 102 facilitates the reading or writing of data to RFID tags, e.g. RFID tag 110 that are within range of the RF field emitted by antenna 106. Finally, digital electronics 114 can be interfaced with an integral display and/or provide a parallel or serial communications interface to a host computer or industrial controller, e.g. host computer 116.

Also by way of background, Symmetric-key algorithms are a class of algorithms for cryptography that use trivially related, often identical, cryptographic keys for both decryption and encryption. The encryption key is trivially related to the decryption key, in that they may be identical or there is a simple transform to go between the two keys. The keys, in practice, represent a shared secret between two or more parties that can be used to maintain a private information link.

Symmetric-key algorithms can be divided into stream ciphers and block ciphers. Stream ciphers encrypt the bits of the message one at a time, and block ciphers take a number of bits and encrypt them as a single unit. Blocks of 64 bits have been commonly used; the Advanced Encryption Standard (AES) algorithm approved by NIST in December 2001 uses 128-bit blocks. Some examples of popular and well-respected symmetric algorithms include Twofish, Serpent, AES (aka Rijndael), Blowfish, CAST5, RC4, TDES, and IDEA.

Unlike symmetric algorithms, asymmetric key algorithms use a different key for encryption than for decryption. I.e., a user knowing the encryption key of an asymmetric algorithm can encrypt messages, but cannot derive the decryption key and cannot decrypt messages encrypted with that key. Symmetric-key algorithms are generally much less computationally intensive than asymmetric key algorithms. In practice, asymmetric key algorithms are typically hundreds to thousands times slower than symmetric key algorithms.

One disadvantage of symmetric-key algorithms is the requirement of a shared secret key, with one copy at each end. In order to ensure secure communications between everyone in a population of (n) people a total of $n(n-1)/2$ keys are needed, which is the total number of possible communication channels. To limit the impact of a potential discovery by a cryptographic adversary, they should be changed regularly and kept secure during distribution and in service. The process of selecting, distributing and storing keys is known as key management, and as noted is difficult to achieve reliably and securely. For example, symmetric ciphers have historically been susceptible to known-plaintext attacks, chosen plaintext attacks, differential cryptanalysis and linear cryptanalysis.

When used with asymmetric ciphers for key transfer, pseudorandom key generators are nearly always used to generate the symmetric cipher session keys. Lack of randomness in those generators or in their initialization vectors is disastrous and has led to cryptanalytic breaks in the past. Therefore, it is essential that an implementation uses a source of high entropy for its initialization.

In cryptography, an initialization vector (IV) is a block of bits that is required to allow a stream cipher or a block cipher to be executed in any of several streaming modes of operation to produce a unique stream independent from other streams produced by the same encryption key, without having to go through a (usually lengthy) re-keying process.

The size of the IV depends on the encryption algorithm and on the cryptographic protocol in use and is normally as large as the block size of the cipher or as large as the encryption key. The IV must be known to the recipient of the encrypted information to be able to decrypt it. This can be ensured in a number of ways: by transmitting the IV along with the packet, by agreeing on it beforehand during the key exchange or the handshake, by calculating it, usually incrementally), or by measuring such parameters as current time, used in hardware authentication tokens such as RSA SecurID, VASCO Digipass, etc., IDs such as sender's and/or recipient's address or ID, file ID, the packet, sector or cluster number, etc. A number of variables can be combined or hashed together, depending on the protocol. If the IV is chosen at random, the cryptographer must take into consideration the probability of collisions, and if an incremental IV is used as a nonce, the algorithm's resistance to related-IV attacks must also be considered.

IVs are implemented differently in block ciphers and in stream ciphers. In straight-forward operation of block ciphers or so-called Electronic Code Book (ECB) mode, encryption of the same plain text with the same key results in the same cipher text, this results in a considerable threat to security. Use of an initialization vector linearly added to (XORed with) the first block of plaintext or included in front of the plaintext prior to encryption in one of the streaming modes of operation solves this problem.

In stream ciphers, IVs are loaded into the keyed internal secret state of the cipher, after which a number of cipher rounds is executed prior to releasing the first bit of output. For performance reasons, designers of stream ciphers try to keep that number of rounds as small as possible, but because determining the minimal secure number of rounds for stream ciphers is not a trivial task, and considering other issues such as entropy loss, unique to each cipher construction, related-IVs and other IV-related attacks are a known security issue for stream ciphers, which makes IV loading in stream ciphers a serious concern and a subject of ongoing research.

The 802.11 encryption algorithm called WEP (short for Wired Equivalent Privacy), for example, used a "weak IV" that was led to it being easily cracked. Packet injection allowed for WEP to be cracked in times as short as 15 minutes or less. This ultimately led to the deprecation of WEP.

SUMMARY

Systems and methods for cryptographic communication in which the privacy of certain information can be enhanced are described herein.

According to one aspect, a method for secure cryptographic communication comprises transmitting information that identifies a group key from a first device to a second device. The method further comprises, in the first device, using the group key to encrypt an input vector, transmitting the encrypted input vector, encrypting privacy-sensitive information using a device key, an encryption algorithm, and the input vector, and transmitting the encrypted privacy-sensitive information to the second device.

According to another embodiment, an RFID device comprises an antenna; a memory configured to store information including a group key, information identifying the group key, an input vector, a device key and privacy-sensitive information; and a processor coupled with the memory and the antenna, the processor configured to transmit group key identifying information stored in the memory via the antenna, use the group key to encrypt an input vector, transmit the encrypted input vector via the antenna, encrypt the privacy-sensitive information stored in the memory using the device key, an encryption algorithm, and the input vector, and transmit the encrypted privacy-sensitive information.

According to still another aspect, a communication system comprises a first device comprising an antenna; a memory configured to store information including a group key, information identifying the group key, an input vector, a device key and privacy-sensitive information; and a processor coupled with the memory and the antenna, the processor configured to transmit group key identifying information stored in the memory via the antenna, use the group key to encrypt an input vector, transmit the encrypted input vector via the antenna, encrypt the privacy-sensitive information stored in the memory using the device key, an encryption algorithm, and the input vector, and transmit the encrypted privacy-sensitive information; and a second device comprising an antenna; and a processor coupled with the antenna, the processor configured to receive the information that identifies a group key via the antenna, use the received information to identify the group key, receive the encrypted input vector via the antenna, receive the encrypted privacy-sensitive information via the antenna, use the identified group key to decrypt the input vector, and use the decrypted input vector and the encryption algorithm to decrypt the privacy-sensitive information.

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

In the embodiments described below, transmitted privacy-sensitive cryptographic parameters are themselves encrypted in order to maintain the privacy of the user of the transmitting device. The encryption method used can be one that does not require privacy-sensitive cryptographic parameters of its own. In one embodiment, symmetric cryptography, e.g., AES is used, with the cryptographic key used in the encryption being a Group Key that can be selected in a way that doesn't compromise privacy. For example, a unique Group Key can be associated with a tuple consisting of an Issuing Authority and Expiration Date. In many embodiments, neither component of the tuple is considered privacy-sensitive. This Group Key can then be used to encrypt a privacy-sensitive cryptographic parameter, e.g., the IV. An encryption mode such as Electronic Codebook (ECB) can be used, which doesn't itself require an initialization vector.

Figure 1:
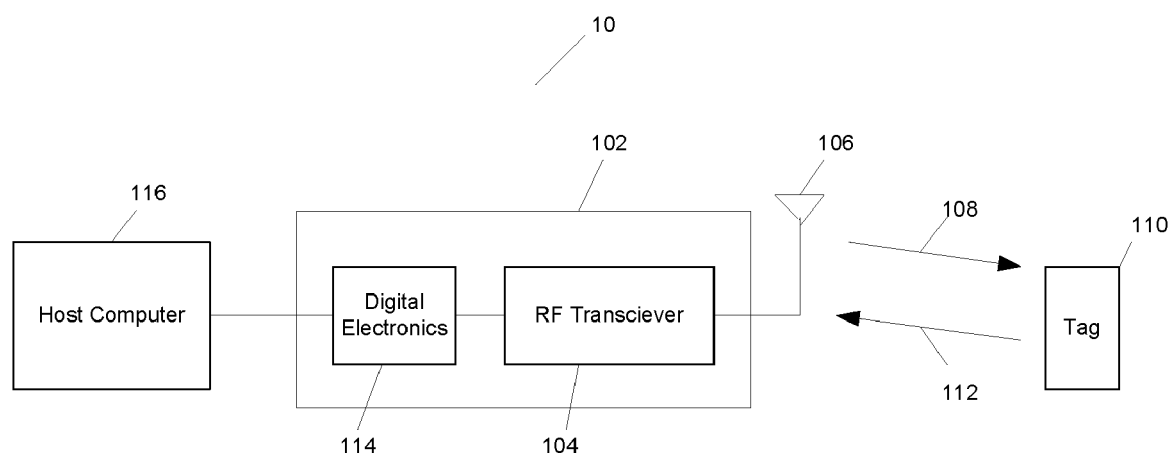
FIG. 1 is a diagram illustrating an exemplary RFID system.
Figure 2:
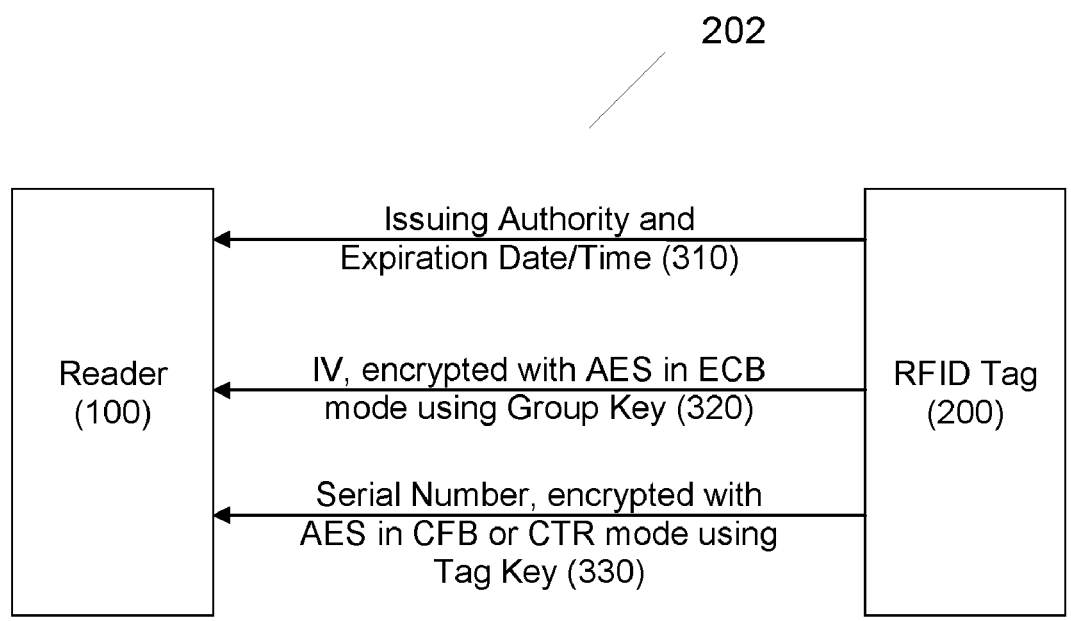
FIG. 2 is a diagram illustrating an RFID system configured in accordance with one example embodiment.

FIG. 2 illustrates one embodiment of an RFID system 202 configured in accordance with one embodiment. RFID system 202 comprises an RFID tag 200, which can be similar to RFID tag 110 described above, and RFID reader 100, which can be similar to RFID reader 102 described above. In certain embodiments, for privacy protection, RFID Tag 200 uses a symmetric algorithm, such as AES, with a unique Tag Key, e.g., a key that is unique for each Tag, to protect a unique Serial Number stored within the Tag 200 memory and other privacy-sensitive information, such as, e.g., Cyclic Redundancy Check (CRC) information, when this information is transmitted to Reader 100.

In certain embodiments, the RFID Tag 200 uses a mode of AES that uses an Initialization Vector (IV), such as Cipher Feedback (CFB) mode, Counter (CTR) mode, or other mode that uses an IV, so that the cipher text changes for each transmission. The IV must be unique for each transmission. It can either be a counter, or, for CFB, either a counter or a random number. When a counter is used, the value of the counter can be privacy-sensitive.

If the counter is transmitted in plaintext, an attacker could track the value of the counter for an individual tag, thereby compromising privacy. Therefore, the Tag 200 can be configured to encrypt the IV using a symmetric algorithm such as AES with the Group Key as input, using an encryption mode that doesn't require an IV such as Electronic Code Book (ECB). The same Group Key can be used for a number of Tags, and the identifier of the Group Key is not necessarily considered privacy-sensitive. For example, there may be a unique Group Key associated with each Issuing Authority and Expiration Date/Time Range.

The Group Key value and identifier can be programmed into the RFID Tag memory when the Tag is issued. A database of these Group Keys can then be maintained on either Reader 100 or a Back-end Server to which Reader 100 is connected. The database can be accessed using the Group Key identifier. In the event that a Group Key is compromised, a new Group Key can be distributed to the Tags that use the compromised key. The new Group Key can be encrypted prior to being transmitted to a Tag using the unique Tag Key as input to a symmetric cryptographic algorithm.

FIG. 2 can also be used to explain a method for secure communication in accordance with one embodiment. In step 310, Tag 200 first transmits in plain-text to Reader 200 the information needed to identify the Group Key. This may be Issuing Authority, if there is more than one, and Expiration Date or Expiration Date/Time. Tag 200 uses the Group Key to encrypt the IV to be input into the encryption of its privacy-sensitive information to be later transmitted in step 330. Tag 200 then, in step 320, transmits the encrypted IV to Reader 100. Finally, Tag 200 encrypts the unique Serial Number and other data information, using the Tag's key and the IV that it transmitted in step 320. Depending on the embodiment, an encryption algorithm such as AES in a mode with an IV such as CFB or CTR mode can be used. In step 330, Tag 200 transmits the resulting cipher text to Reader 100.

It should be noted that although FIG. 2 shows the transmission steps in an order that is most logical, these steps may be combined or the order changed.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings. For example, while the embodiments described above related to RFID systems, it will be understood that the systems and methods described herein can be applied in other types of communication systems including wired and wireless communication systems.

What is claimed is:

1. A method for secure cryptographic communication, comprising:
   transmitting information that can be used to reference a group key from a first device to a second device;
   in the first device, using the group key to encrypt an input vector;
   in the first device, transmitting the encrypted input vector;
   in the first device, encrypting privacy-sensitive information using a device key, an encryption algorithm, and the input vector; and
   in the first device, transmitting the encrypted privacy-sensitive information to the second device,
   wherein the group key is referenced by a tuple comprising privacy-insensitive information, and wherein the privacy-insensitive information includes information related to an issuing authority and an expiration date.

2. The method of claim 1, further comprising, in the second device:
   receiving the information that can be used to reference a group key;
   using the received information to reference the group key;
   receiving the encrypted input vector;
   receiving the encrypted privacy-sensitive information;
   using the identified group key to decrypt the input vector; and
   using the decrypted input vector and the encryption algorithm to decrypt the privacy-sensitive information.

3. The method of claim 1, wherein the encryption algorithm is the Advanced Encryption Standard (AES).

4. The method of claim 1, wherein the encryption algorithm is performed in a cipher feedback mode.

5. The method of claim 1, wherein the encryption algorithm is operated in a counter mode.

6. The method of claim 1, wherein the privacy-sensitive information includes a unique serial number.

7. The method of claim 1, wherein the device key is unique to the first device.

8. The method of claim 1, wherein the first device is a Radio Frequency Identification (RFID) tag and the second device is an RFID reader.

9. An RFID device, comprising:
   an antenna;
   a memory configured to store information including a group key, information that can be used to reference the group key, an input vector, a device key and privacy-sensitive information; and
   a processor coupled with the memory and the antenna, the processor configured to:
   transmit the information that can be used to reference the group key stored in the memory via the antenna,
   use the group key to encrypt an input vector,
   transmit the encrypted input vector via the antenna,
   encrypt the privacy-sensitive information stored in the memory using the device key, an encryption algorithm, and the input vector, and
   transmit the encrypted privacy-sensitive information, wherein the group key is referenced by a tuple comprising privacy-insensitive information, and wherein the privacy-insensitive information comprises information related to an issuing authority and an expiration date.

10. The RFID device of claim 9, wherein the encryption algorithm is the Advanced Encryption Standard (AES).

11. The RFID device of claim 9, wherein the processor is configured to perform the encryption algorithm in a cipher feedback mode.

12. The RFID device of claim 9, wherein the processor is configured to perform the encryption algorithm in a counter mode.

13. The RFID device of claim 9, wherein the privacy-sensitive information includes a unique serial number.

14. The RFID device of claim 9, wherein the device key is unique to the RFID device.

15. A communication system, comprising:
a first device comprising:
an antenna;
a memory configured to store information including a group key, information that can be used to reference the group key, an input vector, a device key and privacy-sensitive information, and
a processor coupled with the memory and the antenna, the processor configured to:
transmit the information that can be used to reference the group key stored in the memory via the antenna, wherein the group key is referenced by a tuple comprising privacy-insensitive information, and wherein the privacy-insensitive information comprises information related to an issuing authority and an expiration date,
use the group key to encrypt an input vector,
transmit the encrypted input vector via the antenna,
encrypt the privacy-sensitive information stored in the memory using the device key, an encryption algorithm, and the input vector, and
transmit the encrypted privacy-sensitive information; and
a second device comprising:
an antenna, and
a processor coupled with the antenna, the processor configured to receive the information that can be used to reference the group key via the antenna;
use the received information to reference the group key;
receive the encrypted input vector via the antenna;
receive the encrypted privacy-sensitive information via the antenna;
use the referenced group key to decrypt the input vector; and
use the decrypted input vector and the encryption algorithm to decrypt the privacy-sensitive information.

16. The system of claim 15, wherein the encryption algorithm is the Advanced Encryption Standard (AES).

17. The system of claim 15, wherein the processors are configured to perform the encryption algorithm in a cipher feedback mode.

18. The system of claim 15, wherein the processors are configured to perform the encryption algorithm in a counter mode.

19. The system of claim 15, wherein the privacy-sensitive information includes a unique serial number.

20. The system of claim 15, wherein the device key is unique to the first device.

21. The system of claim 15, wherein the first device is a Radio Frequency Identification (RFID) tag and the second device is an RFID reader.

* * * * *